United States Patent [19]
Wilson

[11] 3,937,265
[45] Feb. 10, 1976

[54] APPARATUS FOR MOUNTING AND REMOVING TIRES FROM WHEELS HAVING SEPARABLE WHEEL RIMS

[76] Inventor: Fred C. Wilson, 4611 Dockweiler St., Los Angeles, Calif. 90019

[22] Filed: June 12, 1974

[21] Appl. No.: 478,472

[52] U.S. Cl. ............................. 157/1.2; 157/1.26
[51] Int. Cl.² ......................................... B60C 25/06
[58] Field of Search ........... 151/1.1, 1.17, 1.2, 1.26, 151/1.33

[56] References Cited
UNITED STATES PATENTS

| | | | |
|---|---|---|---|
| 2,362,061 | 11/1944 | Ewing | 157/1.2 |
| 2,742,959 | 4/1956 | Pientkewic | 157/1.2 |
| 2,746,528 | 5/1956 | Damman | 157/1.26 |
| 2,749,975 | 6/1956 | Curtis | 157/1.26 |
| 3,191,656 | 6/1965 | Edwards | 157/1.17 |

FOREIGN PATENTS OR APPLICATIONS

| | | | |
|---|---|---|---|
| 67,436 | 2/1951 | Netherlands | 157/1.2 |

*Primary Examiner*—Al Lawrence Smith
*Assistant Examiner*—Harold P. Smith, Jr.
*Attorney, Agent, or Firm*—Nilsson, Robbins, Bissell, Dalgarn & Berliner

[57] ABSTRACT

Apparatus to be used on a heavy-duty vehicular wheel tire for dislodging the tire from the wheel during removal of the tire from the wheel and for confining a separable wheel rim, should the wheel rim become disengaged from the wheel during inflation of the tire. A rim-retaining structure includes an outwardly extending member affixed to a swivel joint secured to one end of a lever. The lever pivots about a fulcrum mounted on a support member and inflatable bellows secured to the other end of the lever position the rim-retaining means against the tire.

1 Claim, 4 Drawing Figures

3,937,265

APPARATUS FOR MOUNTING AND REMOVING TIRES FROM WHEELS HAVING SEPARABLE WHEEL RIMS

FIELD OF THE INVENTION

The field of art to which the invention pertains includes the field of tire mounting and removal apparatus, particularly with respect to a device for retaining a separable wheel rim during inflation of a tire mounted on a wheel as well as for removal of the tire from the wheel.

BACKGROUND OF THE INVENTION

Disc wheels for pneumatic tires have come into extensive use on large vehicles, e.g. trucks, earth movers, aircraft and the like. Tires for such vehicles are extremely difficult to remove from the wheel and repair or replacement generally require use of power equipment to "break" the tire bead from the wheel. Such equipment known to the prior art is very heavy and usually stationary, thus requiring the tire and wheel be transported to a central location for repair or replacement. Such a requirement is expensive and time consuming and sometimes causes expensive equipment to be idle while a tire is being repaired or replaced. Replacement or repair of a tire on such a wheel can also be very dangerous in that the rim may fly off with great force.

Generally, disc wheels incorporate a separable rim which affords lateral support for one of the tire beads when a tire is mounted on the wheel. Conventionally, such rims take the form of an open ring so that they may be seated in a rim gutter on the wheel, and removed therefrom as to dismount a tire. Although disc wheels have come into widespread use and are certainly effective, the operation of mounting tires on such wheels is sometimes rather dangerous. This danger arises for example, when foreign particles, e.g. dirt or small stones, go unnoticed in the rim gutter and cause the rim to disengage from the wheel when the tire is inflated. Disengagement may also occur in the event of a worn wheel or slight misalignment of the rim and the rim gutter.

Normally, a wheel rim does not disengage until substantial force is applied thereto, such as during the process of inflating the mounted tire. As a consequence, the rim is usually disengaged by a considerable force and accordingly can be very damaging. The risks involved by a forcefully disengaged rim are increased by the fact that the repairman is normally required to be in close proximity to the wheel, so as to hold an air hose coupled to inflate the tire.

In general, various structures have been previously proposed to minimize the danger attendant a disengaged rim with the inflation of a tire that has been freshly mounted on a disc wheel. However, such structures have been somewhat inadequate. Typical devices include a plurality of arms which are affixed to the wheel and act as rim-retaining apparatus during the inflation of the tire. The arms are secured to the wheel on a shaft which extends axially to the wheel with the arms being secured to the wheel by means of a locking nut or clamp. Such devices normally require a relatively large amount of time to secure the arms to the wheel prior to inflation of the tire.

The present invention provides a rapid, safe and convenient safety apparatus which may be readily transported directly to a vehicle for on the site tire repair or replacement and includes rim retaining means for use during inflation of a tire having a separable wheel rim.

SUMMARY OF THE INVENTION

Apparatus for mounting and removing tires from wheels having separable rims includes outwardly extending tire engaging means supported for reciprocation on power assist means for tire bead breaking and rim retaining.

DESCRIPTION OF THE PREFERRED EMBODIMENT

Figures 1, 2, 3, 4:
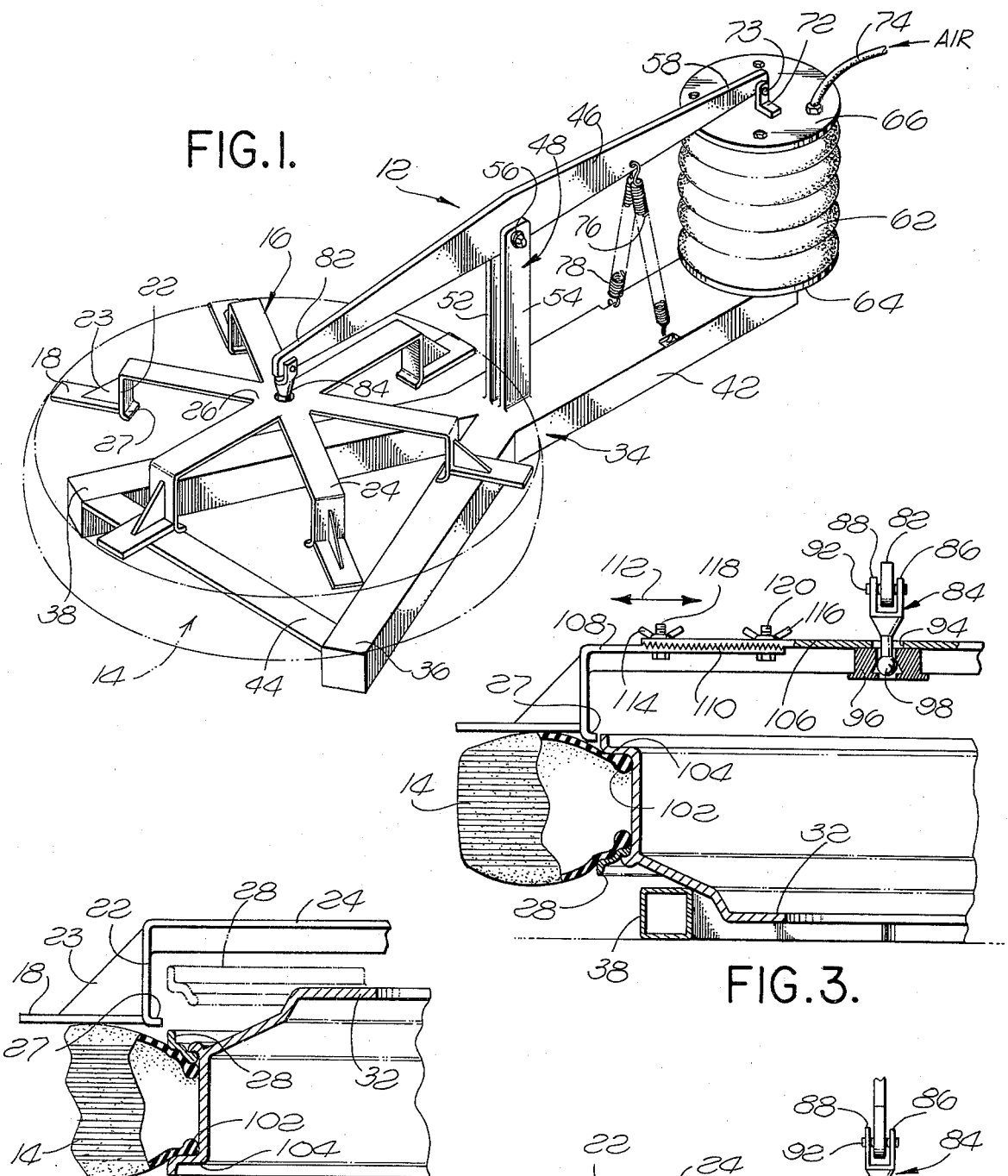
FIG. 1 is a perspective view of the apparatus for mounting and removing a tire from the wheel.
FIG. 2 is a vertical sectional view taken fragmentarily through the structure of FIG. 1 illustrating the use of the apparatus in the mounting mode of operation.
FIG. 3 is a vertical sectional view taken fragmentarily through the structure of FIG. 1 illustrating the tire removal mode of operation.
FIG. 4 is a vertical sectional view of the structure of FIG. 3 illustrating the tire seal disengaged from the wheel.

Referring now to FIG. 1, there is shown a tire mounting and removing apparatus 12 constructed in accordance with principles of the invention. The apparatus 12 is illustrated with a tire 14 shown in dotted lines, in position for mounting or removing the tire with respect to a wheel. (The wheel and rim have been omitted from FIG. 1 for purposes of clarity, but are illustrated in FIG. 2.) Outwardly extending tire engaging means 16 is moved downwardly into engagement with the tire 14 by a power assist means such as a bellows 62 to break the tire bead from a wheel. The tire may then be removed from the wheel, then repaired and/or replaced as desired. After the tire 14 is remounted on the wheel it must be inflated. It is during the initial inflation, after freshly mounting the tire 14 on the wheel, that a substantial danger exists from forceful disengagement of a rim from the wheel. Accordingly, as illustrated in FIG. 1, the outwardly extending tire engaging means includes means for capturing and retaining the rim in the event that the rim disengages from the wheel under substantial force of pressure within the tire 14. Thus, the apparatus of the present invention performs the dual function of providing portable tire changing and safety means for disengaged rim retention.

Considering the apparatus in greater detail, reference will now be made somewhat concurrently to FIGS. 1 and 2. As is therein shown, the outwardly extending tire engaging means includes a plurality of L-shaped arms 24, having a base 22, extending from a central hub 26. The arms 24 terminate in a slight radially inwardly directed lip 27 which engages the tire adjacent the bead to break the same from the wheel as shown in more detail in FIGS. 3 and 4. A plate member 18 is permanently affixed adjacent the end of each L-shaped arm and is radially outwardly directed therefrom. Ribs 23 are permanently affixed between the base 22 of each arm and its respective plate 18 to provide structural strength.

The apparatus includes a generally Y-shaped support 34 formed of a pair of outwardly extending legs 36, 38 and a base 42. A support bar 44 is connected between the ends of the legs 36 and 38 to provide a support surface for the tire 14 to rest upon.

Power assist means is coupled to the means 16 by means of a lever 46 which pivots about a fulcrum 48. The fulcrum 48 is formed of a pair of parallel plates 52 and 54 permanently affixed to the Y-shaped support 34 and spaced apart a sufficient distance to pivotably support the lever 46 therebetween by a pin 56.

One end 58 of the lever 46 is positioned approximately above the free end of the support base 42. Air inflatable bellows 62 are secured between the free end of the support base 42 and the end 58 of the lever. The bellows 62 expand and contract between a lower plate 64 secured to the free end of the base 42 and an upper plate 66 secured to the end 58 of the lever by means of a pair of L-shaped brackets 72 (one of which can be seen in FIG. 1). A pin 73 extends through the arms of the L-shaped bracket 72 and the end 58 of the lever enabling the lever to swivel about the bellows upper plate 66. An airhose 74 is coupled between the bellows and a source of air under pressure (not shown) through the upper plate 66 enabling the bellows to be expanded or contracted as is desired. A pair of springs 76 and 78 is coupled between the lever 46 and the support base 42 intermediate the fulcrum 48 and the bellows 62 and continuously urge the apparatus toward an open position.

The other end 82 of the lever 46 is universally secured to the hub 26. As can be seen in FIG. 3, a yoke 84 contains a pair of spaced apart arms 86, 88 to which the end 82 of the lever is secured by means of a pin 92. The shank of the yoke 84 extends through an opening 94 in the center of the hub 26 and a support bushing 96 which receives a terminating sphere 98 of the yoke 84.

After the tire 14 has been placed between the support surface of the outwardly extending legs 36 and 38 of the Y-shaped support 34 and the safety appliance 16, sufficient air is fed into the bellows 62 to bring radial plates 18 into contact with the tire surface as shown in FIG. 2. Then air under pressure is applied through the valve stem into the tire 14 to inflate the tire. If the rim 28 disengages during the tire inflation the arms 24 will capture and maintain it. When the tire has seated on the wheel 32 and rim 28, the air in the inflatable bellows 62 is slowly released. Should the rim 28 spring loose due to incorrect seating of the rim with respect to the tire and wheel, the radially extending arms 24 will capture and maintain it so that the rim cannot do harm to person or property.

As above pointed out, the apparatus 12 can also be used for removing the tire from the wheel and rim and such is further shown in FIGS. 3 and 4. In this mode of operation, the wheel is placed face down with the rim 28 adjacent the Y-shaped support 34. Once again, the radial plates 18 are positioned adjacent the tire by inflating the bellows 62. In addition, the inwardly extending lips 27 are positioned adjacent the junction of the tire bead 102 and the fixed portion 104 of the wheel 32. Continued inflation of the bellows 62 applies force and causes the radial plates 18 to compress the side walls of the tire 14 while the lips 27 break the tire bead 102 from the wheel fixed portion 104, thus breaking the seal between the wheel and the tire and enabling the tire to be removed from the wheel.

Apparatus constructed in accordance with the present invention may be utilized with various size tires depending upon the vehicle from which the wheel and tire has come. To preclude the necessity of constructing several different sized devices for use with varying sized wheels and tires, the apparatus in the present invention may be made adjustable as is illustrated particularly in FIG. 3. As is therein shown, the arm 24 may be broken into two pieces 106 and 108. Serrations 110 may be provided in each of the portions 106 and 108 of the arm 24 to permit the adjustability of the length of the arm as is indicated by the arrow 112. In operation, one would loosen the wing nuts 114, 116 from the bolts 118, 120, respectively, and then position the two pieces 106, 108 to obtain the desired length. The bolts 118 and 120 would then be re-inserted through appropriate matched openings or within openings and slots as would be obvious to those skilled in the art and the nuts 114 and 116 would be replaced and tightened prior to utilization of the structure as above described.

What is claimed is:

1. Apparatus for use in conjunction with the removing and mounting of truck tires on wheels having separable rims comprising:
  A. a Y-shaped support member including a base and a pair of legs extending outwardly from one end of said base, said pair of legs being separated sufficiently to receive at least a portion of said wheel therebetween;
  B. a lever having first and second ends;
  C. a fulcrum affixed to and extending from said base adjacent said one end thereof;
  D. means pivotally attaching said lever intermediate the ends thereof to said fulcrum;
  E. tire engaging means including a hub and a plurality of L-shaped arms each including a portion extending radially from said hub in a plane parallel to the tire and support member, said arms being symetrically distributed about the circumference of said hub;
  F. means pivotally connecting said hub to said first end of said lever;
  G. fluid actuated power assist means affixed to said base at the other end thereof; and
  H. means pivotally connecting said second end of said lever to said power assist means, thereby to reciprocate said tire engaging means with variable force against a tire on a wheel supported on said Y-shaped legs.

* * * * *